US008150861B2

(12) United States Patent
Sengupta

(10) Patent No.: US 8,150,861 B2
(45) Date of Patent: Apr. 3, 2012

(54) TECHNIQUE FOR IMPLEMENTING DATABASE QUERIES FOR DATA STREAMS USING A CURVED FITTING BASED APPROACH

(75) Inventor: Somenath Sengupta, Edison, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 313 days.

(21) Appl. No.: 11/231,095

(22) Filed: Sep. 20, 2005

(65) Prior Publication Data
US 2007/0067283 A1 Mar. 22, 2007

(51) Int. Cl.
*G06F 7/00* (2006.01)
*G06F 17/30* (2006.01)
(52) U.S. Cl. .................. 707/751; 707/763; 707/766
(58) Field of Classification Search .............. 707/736, 707/751, 763, 766
See application file for complete search history.

(56) References Cited

U.S. PATENT DOCUMENTS

| | | | | |
|---|---|---|---|---|
| 5,774,385 A | * | 6/1998 | Bristol ........................ | 708/203 |
| 7,249,136 B1 | * | 7/2007 | Muthukrishnan et al. .... | 707/101 |
| 2006/0101045 A1 | * | 5/2006 | Chen et al. .................. | 707/101 |

OTHER PUBLICATIONS

Dobra et al, Processing Complex Aggregate Queries over Data Streams, ACM SIGMOD, Jun. 4, 2002, pp. 61-72.*
Papadimitriou et al, Adaptive, unsupervised stream mining, Aug. 12, 2004, Springer-Verlag, pp. 222-239.*
Qiao et al, Rhist: Adaptive Summarization over Continuous Data Streams, ACM, Nov. 9, 2002, pp. 469-476.*
Yurekli (Application of Linear Stochastic Modesl to Monthly Flow Data of Kelkit Stream, Ecological Modelling, Aug. 9, 2004, pp. 67-75).*
Motwani, Query Processing, Resource Management, and Approximation in Data Stream Management System, 2003, CIDR, pp. 1-12.*
Olston, Adaptive Filters for Continuous Queries over Distributed Data Streams, SIGMOD, 2003, pp. 563-574.*
Chen et al., "Applying Segmented Right-Deep Trees to Pipelining Multiple Hash Joins," IEEE Transactions on Knowledge and Data Engineering, vol. 7, No. 4, Aug. 1995, pp. 656-668.
Evans et al., "An Asynchronous Parallel Algorithm for Solving a Class of Nonlinear Simultaneous Equations," Parallel Computing, vol. 17, Nos. 2-3, Jun. 1991, pp. 165-180.
Ramakrishnan and Gehrke, "Evaluation of Relational Operations," Database Management Systems, http://web.archive.org/web/20050507152712/www.cs.wisc.edu/~dbbook/openAccess/thirdEdition/slides/slides3ed-english/Ch14a_Opimple_Joins.pdf, accessed Jan. 7, 2011.
"Outer Joins—Usage and Efficiency," http://web.archive.org/web/2004-2005re_/http://home.clara.net/dwotton/dba/ojoin2.htm, accessed Jan. 3, 2011.
"The Secrets of Materialized Views," http://web.archive.org/web/20051210101243/http://www.akadia.com/services/ora_materialized_views.html, accessed Jan. 3, 2011.
"Identifying the Order of Differencing," http://web.archive.org/web/20080501064816/http://www.duke.edu/~rnau/411arim2.htm, accessed Jan. 3, 2011.
Motwani et al., "Query Processing, Resource Management, and Approximation in a Data Stream Management System"; Stanford University; Proceedings of the 2003 CIDR Conference; 12 pages.

* cited by examiner

*Primary Examiner* — John Cottingham
*Assistant Examiner* — Mariela Reyes
(74) *Attorney, Agent, or Firm* — Fliesler Meyer LLP

(57) ABSTRACT

A stream of data can be estimated by a model to produce an estimated equation. The estimated equation can be used to calibrate a response to a SQL type join query.

32 Claims, 4 Drawing Sheets

TECHNIQUE FOR IMPLEMENTING DATABASE QUERIES FOR DATA STREAMS USING A CURVED FITTING BASED APPROACH

BACKGROUND OF THE INVENTION

The present invention relates to SQL type query systems.

Data streams such as stock quotes, and the like can be stored in a database then analyzed using queries, such as SQL queries. For the data originated in the form of streams and to be analyzed in real time, some SQL queries, especially those using the join operation, can be quite problematic. In a conventional join operation, each data point from each stream must be compared to find the intersection of the two data sets. This works fine, since the datasets are bounded. But for data streams, datasets are unbounded and may require unbounded amount of memory.

DETAILED DESCRIPTION

Figure 1:
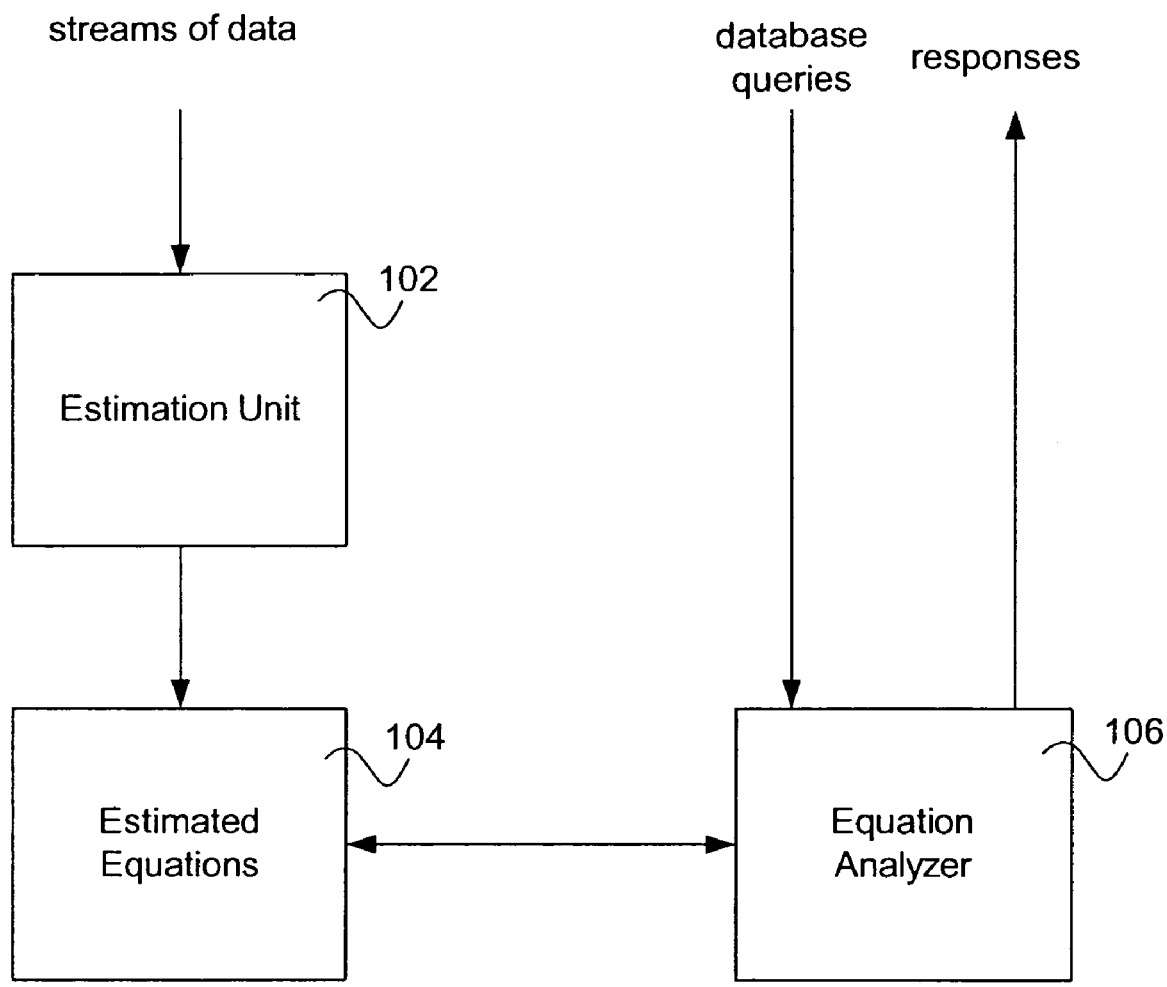
FIG. 1 is a functional diagram of a system of one embodiment of the present invention.

FIG. 1A is a functional diagram of one embodiment. One embodiment of the present invention is a system comprising code receiving a steam of data to construct an equation that closely resembles (approximately) the stream of data (such as estimation unit 102); and code that receives database queries concerning the stream of data and that produce the results using the equation solving technique (such as Equation 106 analyzer.

An estimation unit 102 can receive a stream of data and use a model such as an ARIMA model to create best fit equations. Equation analyzer 106 can receive database queries and produce responses using the estimated equations 104 rather than checking data in a database.

The database queries can be SQL queries. Multiple streams can be modeled using multiple equations. The database queries can include join queries implemented using multiple estimation equations. The equations can be produced using the time series estimation, such as an ARIMA model. Multiple models can be tried in parallel to find out the best fit for a stream. The ARIMA coefficients can be calculated iteratively calculation as data comes in. These coefficients are used to determine the best fit equation for a given stream.

One embodiment of the present invention is a method of receiving a stream of data, approximating the steam of data using an equation, receiving a database query concerning the stream of data, and responding by using the equation to calculate a response.

In one embodiment, the method can be implemented with a processor or computer. Code adapted to implement the method can be put of a computer readable storage media on any type.

Figure 2:
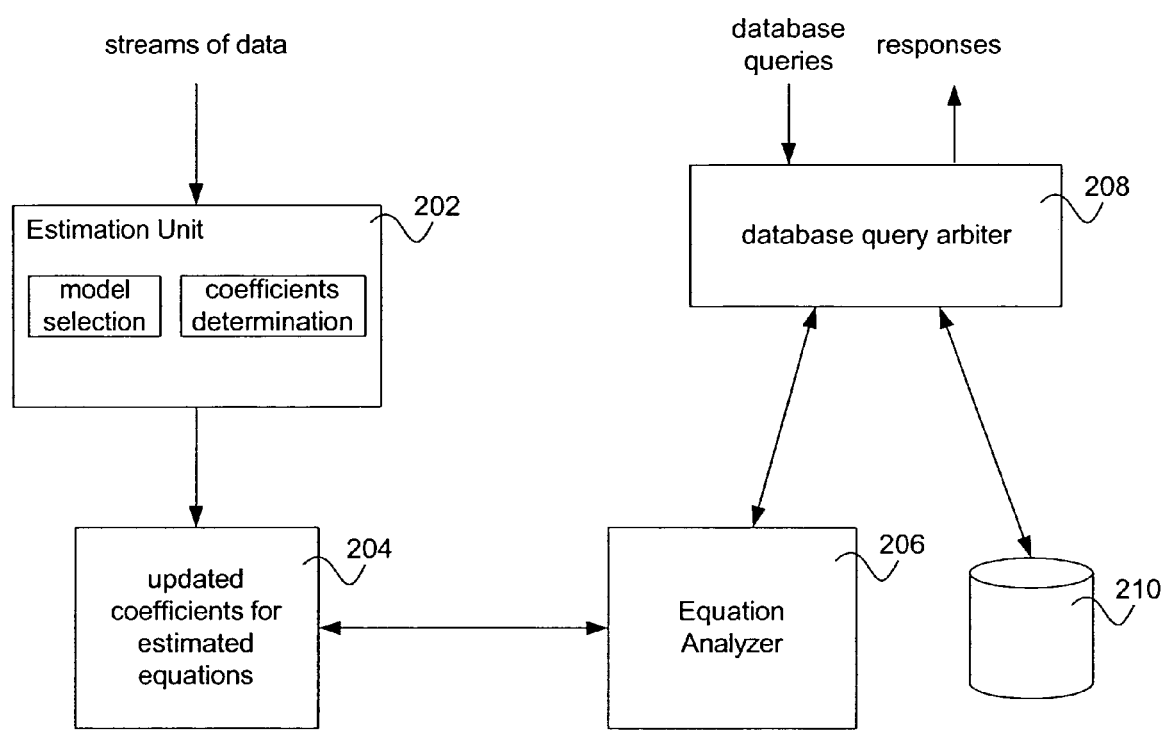
FIG. 2 is a diagram of a system of one embodiment of the present invention.

FIG. 2 shows another example of the system of one embodiment. Streams of data are received by estimation unit 202. The estimation unit 202 can analyze the streams of data.

In one embodiment, the streams of data can be estimated by an equation by the estimation unit 202.

In one embodiment, the estimation unit 202 determines coefficients for the equation. The coefficients can be updated as new data in the data stream is received. In one embodiment, updated coefficients 204 are maintained As database queries, such as SQL queries, are received, in one embodiment, at least some of the queries can be analyzed using the estimate equation. In one embodiment, at least some of the queries can be converted into mathematical relationship using the estimated equations in the equation analysis unit 106. In particular, some join conditions can be quickly calculated by using the estimated equations.

In one embodiment, database queries are received query arbiter 208 can send the queries to the equation analysis unit 206 and other queries to the database 210.

In one embodiment, the estimation unit 202 includes model selection unit 202a which can selects a model for the equation estimation of the data stream.

In one embodiment, equations for multiple model can be compared against a data stream to determine the best model. A coefficient selector unit 202b can select and update the coefficients using the selected model.

Figure 3:
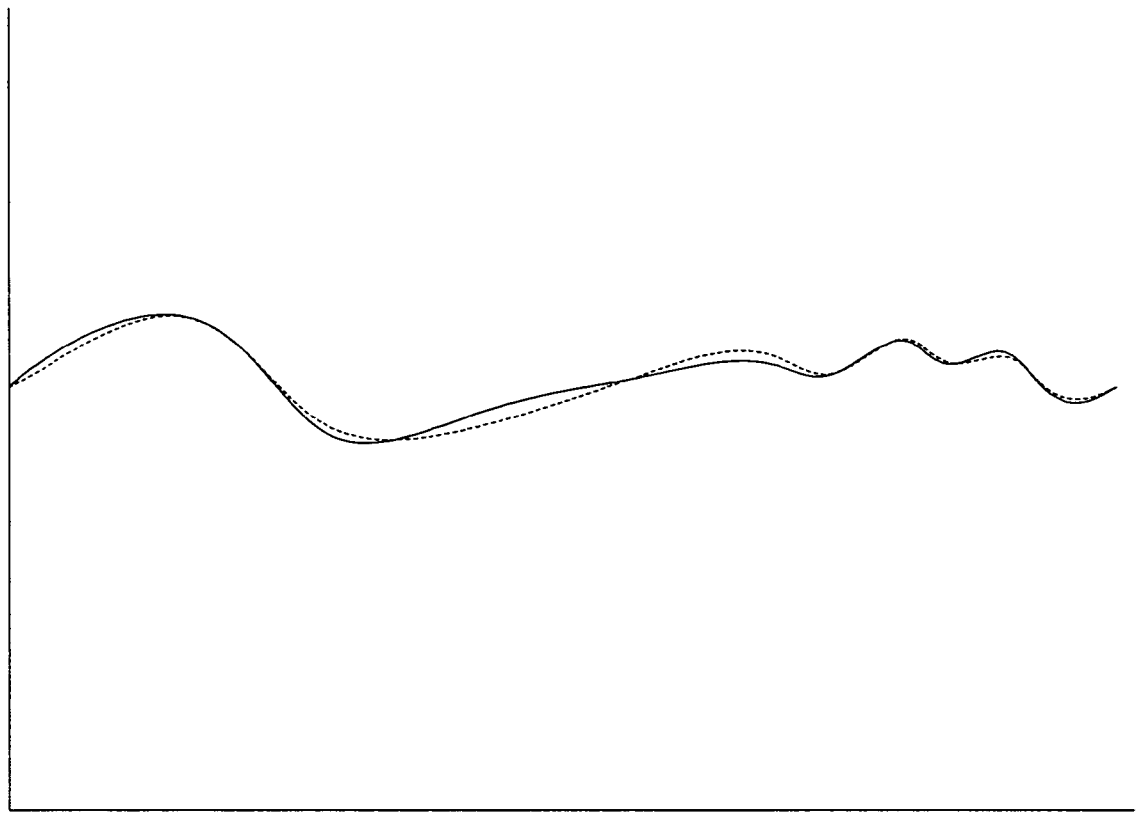
FIG. 3 is an exemplary diagram illustrating the estimation of a stream of data with an equation.

FIG. 3 shows an estimated equation (dotted line) for a stream of data (solid line).

Embodiments of the present invention can enable the implementation of database queries, such as SQL, queries using estimated equations. Embodiments of the present invention can avoid any significant memory requirement specifically for large Join Operations. Embodiments can use suitable curve fitting algorithms and build fitted curves iteratively as more data is received. The query execution can be done in a preconfigured time interval and a periodic execution can return a set of results corresponding to that particular period of time. The solution can be applicable for executing SQL type queries over high speed data steams. A probabilistic technique can be applied towards correcting the data losses and providing the query results with a quantified accuracy. The accuracy can increase with proper identification of the curve to fit the available data stream. The accuracy can be significantly high for specific cases e.g. stock quote streams, where the appropriate curves reflecting the data stream are well known (e.g. log normal).

The information boom of the last decade created great sources of digital data available in real time. Some of them are as follows 1. Market feed carrying the information about continuously changing stock quote.
2. Control messages flowing across the networks.
3. Stream of information originated from RFID sensors.

This information outburst creates new opportunities in the context of more intelligent decision making in real time such as 1. A Trader can rebalance his Portfolio on the basis of breaking news and market volatility.
2. Customer service monitoring application needs to correlate customer complaint rates with Service Level Agreement (SLA) violations in order processing due to the events e.g. network failure/delay, computing resource utilization etc.

The real time decision making out of several information sources can require very query capability over multiple high speed data streams. At the same time, since the amount of data required to run the query is continuously growing, the old technique of using memory stores for a bounded set of data does not work well. Embodiments of the system proposed here, enable a computational technique of querying data based on the foundation of estimated equation, such as with time series analysis, without the use of a large memory store.

Embodiments of the Present Invention

1. Eliminate high memory growth caused by the high volume data streams queried upon, since no data need to be stored in this approach.
2. Eliminate the lost data problem by using of statistical techniques (with high degree of accuracy) to implement the SQL type queries applied over any stream.

Figure 4:
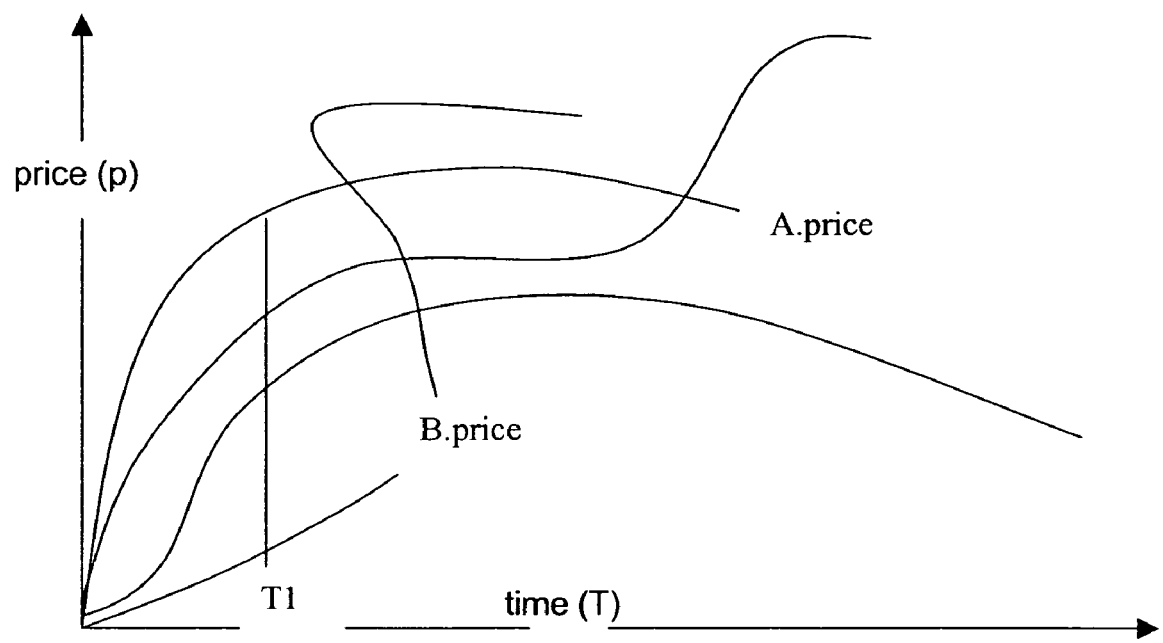
FIG. 4 is an exemplary diagram illustrating data streams A and B.

FIGS. 4A and 4B represent two continuous streams of stock prices for tickers A and B. The price changes can be considered continuous with respect to the time while each point on the curve represents an instantaneous price of those particular stock tickers.

Embodiments of the present invention approach states that since each curve can be presented as one equation or inequality (via use of curve fitting technique), SQL type queries representing a join condition between the continuous streams A and B, can be implemented using the simultaneous solution of the equations. The idea can be extended for an n-way join where number of involve streams and corresponding equations is n. Some embodiments of the present invention do not require memory storage for join operations on a large set of data. Two simple examples are used below to demonstrate the technique.

Example #1

Select Price from A and B where A.price=B.price

The above query can be replaced by the solution set of simultaneous equations representing A.price and B.price Example #2

Select Price from A and B where A.price>B.price

The above query can be replaced by the solution set of simultaneous equations representing A.price and B.price and the inequality representing. A.price>B.price In each case, the query results would either target for a specific time window or for no time window. With a larger time-window or no time-window, where time series pattern changes for every sub-interval within that time window; the performance of query execution may degrade.

The embodiments of the present invention can use numerical techniques for solving the simultaneous equations and inequalities. The Steps involved in the process of finding the query results in embodiments of the present invention can be include the following:

The ARIMA model of curve fitting is described below. But, other estimation methods can be used.

For every sub-interval within a time window, calculate the statistical coefficients from the continuous stream of data s. Use iterative method to calculate the coefficients within each sub-interval. The relevant coefficients are:

a. Autocorrelogram
b. Partial autocorrelogram
c. Standard deviation
d. Mean

As an example, $$r_j = \frac{\sum_{t=j+1}^{T}(y_t - \bar{y})(y_{t-j} - \bar{y})}{\sum_{t=1}^{T}(y - \bar{y})^2} \forall j$$

represents Autocorrelogram and can be calculated iteratively as the data yt becomes available as the part of continuous stream.

The following five rules can be used to identify the right curve for a particular stream:

Rule 1: If the series has positive autocorrelations out to a high number of lags, then it probably needs a higher order of differencing.

Rule 2: If the lag-1 autocorrelation is zero or negative, or the autocorrelations are all small and patternless, then the series does not need a higher order of differencing. If the lag-1 autocorrelation is −0.5 or more negative, the series may be over differenced. Rule 3: The optimal order of differencing is often the order of differencing at which the standard deviation is lowest.

Rule 4: A model with no orders of differencing assumes that the original series is stationary (mean-reverting). A model with one order of differencing assumes that the original series has a constant average trend (e.g. a random walk or SES-type model, with or without growth). A model with two orders of total differencing assumes that the original series has a time-varying trend (e.g. a random trend or LES-type model).

Rule 5: A model with no orders of differencing normally includes a constant term (which represents the mean of the series). A model with two orders of total differencing normally does not include a constant term. In a model with one order of total differencing, a constant term should be included if the series has a non-zero average trend.

Each coefficient mentioned above can be calculated from the data observed in a configurable time period named as sub-interval of a query time window. This process can be repeated for each sub-interval, since the same data stream can demonstrate two different patterns in two different time periods.

Majority of empirical time series patterns can be sufficiently approximated using one of the 5 basic models (see below) that can be identified based on the shape of the autocorrelogram (ACF) and partial auto correlogram (PACF). [Since the number of parameters (to be estimated) of each kind is almost never greater than 2, it is often practical to try alternative models on the same data.]

1. One autoregressive (p) parameter: ACF—exponential decay; PACF—spike at lag 1, no correlation for other lags.
2. Two autoregressive (p) parameters: ACF—a sine-wave shape pattern or a set of exponential decays; PACF—spikes at lags 1 and 2, no correlation for other lags.
3. One moving average (q) parameter: ACF—spike at lag 1, no correlation for other lags; PACF—damps out exponentially.
4. Two moving average (q) parameters: ACF—spikes at lags 1 and 2, no correlation for other lags; PACF—a sine-wave shape pattern or a set of exponential decays.
5. One autoregressive (p) and one moving average (q) parameter: ACF—exponential decay starting at lag 1; PACF—exponential decay starting at lag 1.

Calculate the parameters associated with the different flavors of ARIMA model. Step #2 goes parallel with step #1, since the parameters are required right away to build the curve once the basic time series pattern is identified.

Each parameter is calculated iteratively over a configurable time period. As an example, least squares estimation conditioned on the first p observations in the case of pure Auto Regression (AR) models leading to the usual estimator $$\hat{\phi}LS = \frac{\sum_t y_t y_{t-1}}{\sum_t y_{t-1}^2}$$

where the process AR(1) has zero mean, and conditioned on the first value y1. "Phi" is one of the parameters of ARIMA model and referred as autoregressive coefficient.

In a general, model with a Moving Average (MA) to estimate the parameter θ of the MA(1) process, requires solution to the following equation $$\min \sum_{t=2}^{T} \epsilon_t^2 = \min \sum_{t=2}^{T} \left( \sum_{i=0}^{t-1} (-1)^i \theta^i z_{t-i} \right)^2$$

which is a nonlinear function of θ. The common nonlinear optimization algorithms such as Gauss-Newton can be applied in order to get the estimates.

Both the equations above consist of a part reflecting a summation of observed data [yt and zt=$\Delta^d y_t^{(\lambda,)}$] over a given period of time. The summation can be calculated iteratively as the data yt becomes available as the part of continuous stream.

Once the exact curves are identified, the set of simultaneous equations/inequalities can be solved numerically to find the query results. The result can contain different time instants and corresponding prices. Since the ARIMA technique produces linear equations, the matrix method can be used. There are several very fast and efficient algorithms existing which can be leveraged to solve the set of simultaneous equations and inequalities.

If the query is effective for a longer time window, the chances are more likely that multiple ARIMA pattern is required for different sub intervals of the total time window. So that in case of two streams e.g. A and B, we may end up solving more than two simultaneous equations.

The equation representing price of a particular ticker for any sub-interval has to be solved simultaneously with the equations representing the other ticker price for all the previous intervals. The equations correspond to the same sub-interval produces the result set bounded by the same sub-interval.

The equations corresponding to different sub-intervals can be brought under the same sub-interval by applying appropriate shifts to the value of time. Once that is done, the result set can be obtained by solving the simultaneous equations and inequalities Each query condition such as A.price=B.price can be approximately satisfied. The values compared here, are the predicted values from a curve fitting algorithm. Each value can actually be shifted from the original value with a percentage of error called e (MPE). There are few possible ways the shift can take place. The set of drifts can take place between the curve representing A and B is {2e,e,0}. The details are as follows.

The possible actual positions of the point on the curve A for the given condition A.price=B.price is {A.price+e, A.price, A.price−e}. The possible actual positions of the point on the curve A for the given condition A.price=B.price is {B.price+e, B.price, B.price−e}. Thus, the worst possible drift can be A.price+e−(B.price−e)=2e+A.price−B.price=2e; since A.price=B.price. Thus, the worse drift can be A.price+e−(B.price)=e+A.price−B.price=e; since A.price=B.price The conditional probability of the event, when a particular maximum drift takes place is the probability of a drift to the curve A given the fact that the curve B has also drifted for the points satisfying A.price=B.price and it is (⅓.*⅓). There are two pairs of A.price and B.price, when the max drift can take place such as {A.price+e, B.price−e} and {A.price−e, B.price+e}. Thus conditional probability for the occurrence of any maximum shift is 2*((⅓.*⅓).

The conditional probability of the event, when a particular drift of e takes place is the probability of a drift to the curve A given the fact that the curve B has not drifted for the points satisfying A.price=B.price and it is (⅓.*⅓). There are four pairs of A.price and B.price, when the max drift can take place such as {A.price, B.price−e},{A.price, B.price+e},{A.price+e, B.price} and {A.price−e, B.price}. Thus conditional probability for the occurrence of any shift of e is 4*((⅓.*⅓).

The expected amount of drift can occur for the points satisfying A.price=B.price is 2e*(⅓*⅓)*2+e*(⅓*⅓)*4=⅜e. Interestingly, it shows that the expectation for having a drift in either A or B for the points satisfying A.price=B.price is less than the MPE.

An expected value of error can be calculated to take care of the error factors in the curve fitting. The same is true for B.price. Any time a query condition is satisfied, it has to be under the constraint of an error limit. The user of the algorithm should be able to set a percentage value of this error limit and the algorithm will accordingly filter out the result of the query. In this particular example if (A.price−B.price)/(smaller value of A.price and B.price)>(error limit), the result set will filter out those A.price and B.price values for the queries e.g. A.price>B.price, a set of drifts can take place between the curve representing A and B. The details are as follows.

The possible actual positions of the point on the curve A for the given condition A.price>B.price is {A.price+e, A.price, A.price−e}. The possible actual positions of the point on the curve A for the given condition A.price>B.price is {B.price+e, B.price,B.price−e}. Thus, the type of errors which actually gives a false impression of the fact that A.price>B.price are:
1. A.price+e is greater than B.price−e but A.price is not greater than B.price
The possible drift is (2e+A.price−B.price)
2. A.price+e is greater than B.price but A.price is not greater than B.price
The possible drift is (e+A.price−B.price)
3. A.price is greater than B.price−e but A.price is not greater than B.price
The possible drift is (e+A.price−B.price)

The conditional probability of the event, when a particular drift (2e+A.price−B.price) takes place is the probability of a drift to the curve A given the fact that the curve B has also drifted for the points satisfying A.price>B.price and it is (⅓*⅓). There is one pair of A.price and B.price, when the particular drift (2e+A.price−B.price) can take place such as {A.price+e, B.price−e}. Thus conditional probability for the occurrence of any maximum shift is 1*((⅓*⅓).

The conditional probability of the event, when a particular drift (e+A.price−B.price) takes place is the probability of a drift to the curve A given the fact that the curve B has not drifted for the points satisfying A.price>B.price and it is ($\frac{1}{3}$.*$\frac{1}{3}$). There are two pairs of A.price and B.price, when this drift can take place such as {A.price+e, B.price−e},{A.price, B.price−e}. Thus conditional probability for the occurrence of any shift of e is 2*(($\frac{1}{3}$.*$\frac{1}{3}$).

Thus the expected amount of drift can occur for the points satisfying A.price>B.price is (2e+A.price−B.price)*($\frac{1}{3}$*$\frac{1}{3}$)*1+(e+A.price−B.price)*($\frac{1}{3}$*$\frac{1}{3}$)*2=$\frac{4}{9}$e+(A.price−B.price)/3 where (A.price−B.price) is zero or negative. Interestingly, it shows that the expectation for having a drift in either A or B for the points satisfying A.price>B.price is less than the MPE.

The expected value of the error can be calculated to take care of the error factors in the curve fitting. The same is true for B.price. Any time a query condition is satisfied, it can to be under the constraint of an error limit. The user of the algorithm can set a percentage value of this error limit and the algorithm will accordingly filter out the result of the query. In this particular example if (A.price−B.price)/(smaller value of A.price and B.price)>(error limit), the result set will filter out those A.price and B.price values Few more Example Queries Select A.quantity from A and B where A.price=B.price Select A.quantity from A and B where A.price>B.price The above mentioned queries can be implemented using the proposed technique. But in addition to the proposed technique, a separate curve can be maintained for A.quantity. The solution (time instant t) of the equations representing A.price and B.price can be used to find the corresponding A.quantity.

Advantages of methods of the present invention include:

1. No use of memory while handling high volume of records changing continuously.
2. Incremental approach i.e. query results are available as data coming in across multiple streams.
3. The query execution can occur periodically. The period can be preconfigured on a need basis. Every time the query is executed, multiple results can be found at a time. Since query execution is very processor intensive, the saving coming out of calculating multiple results at a time is very helpful in this context.
4. If the quality of data is not good old the style of join implementation will not produce accurate results. The statistical treatment of data proposed here can offer more meaningful results aligned with the expected trend.
5. Since the technique uses equation based solutions, the same equations can be used to replay the data real fast without accessing any data stores.

Note that:

1. If the type of the curve selected to fit the stream is wrong, query results can deviate badly from the original
2. The present system can be computationally intensive. This should not be an issue for highly parallel systems.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method for implementing database queries for a plurality of streams of data, comprising:
   receiving a plurality of streams of data, for storage in a database;
   for each of the plurality of streams of data, sampling that stream of data at a plurality of time intervals to capture a plurality of samples, wherein each sample corresponds to a portion of that stream of data captured during that time interval;
   providing a plurality of equations and equation coefficients stored in an equation analysis unit;
   for each of the plurality of samples, approximating that sample by selecting an equation and equation coefficients that optimally fits that sample, wherein the equation and equation coefficients for each of the plurality of samples is selected from the plurality of equations and equation coefficients stored in the equation analysis unit;
   storing the plurality of streams of data in the database;
   storing the equations and equation coefficients approximating the plurality of samples in the equation analysis unit;
   subsequently receiving, by a database query arbiter, a query for data which includes a join over two or more of the streams of data, for a particular time interval;
   determining whether to respond to the query by retrieving data from the database, or by using the equations, and when it is determined to respond using the equations, then
      forwarding the query to the equation analysis unit,
      determining, for each of the two or more streams of data, the particular time interval the query is directed to,
      determining, based on the particular time interval the query is directed to for each of the two or more streams of data, which equation and equation coefficients from the plurality of equation and equation coefficients fit that stream of data for that particular time interval,
      selecting, based on the particular time interval the query is directed to for each of the two or more streams of data, the equation and equation coefficients that fit that stream of data for that particular time interval, and
      simultaneously solving the selected equations to determine a response to the query; and
   wherein the method steps are performed by at least one processor.

2. The method of claim 1, wherein the database query is a SQL query.

3. The method of claim 1, wherein multiple streams are modeled using multiple equations.

4. The method of claim 3, wherein the database query is a join query on a numerical condition using the multiple equations.

5. The method of claim 1, wherein the equation is produced using an ARIMA model.

6. The method of claim 1, wherein multiple models are used to produce multiple equations to approximate a single stream of data to select a model and equation that produces a good fit to the stream of data.

7. The method of claim 1, wherein coefficients for the equation are calculated iteratively and maintained.

8. The method of claim 1, wherein the equation and coefficients for the equation are updated as more of the stream of data is received.

9. The method of claim 1, wherein a probabilistic technique is applied towards correcting data losses and provides the response to the query with a quantified accuracy.

10. The method of claim 1, wherein the step of selecting an equation and equation coefficients that optimally fits that sample further includes
testing a plurality of equations in parallel for said sample, and selecting the equation and equation coefficients that optimally fits said sample.

11. A computer implemented system for implementing database queries for a plurality of streams of data comprising:
one or more processors to execute code;
code to a plurality of streams of data, for storage in a database;
code that for each of the plurality of streams of data, sampling that stream of data at a plurality of time intervals to capture a plurality of samples, wherein each sample corresponds to a portion of that stream of data captured during that time interval; code to provide a plurality of equations and equation coefficients stored in an equation analysis unit;
code that for each of the plurality of samples, approximating that sample by selecting an equation and equation coefficients that optimally fits that sample, wherein the equation and equation coefficients for each of the plurality of samples is selected from a plurality of equations and equation coefficients stored in the equation analysis unit;
code for storing the plurality of streams of data in the database;
code for storing the equations and equation coefficients approximating the plurality of samples in the equation analysis unit;
code that subsequently receives, by a database query arbiter, a query for data which includes a join over two or more of the streams of data, for a particular time interval;
code that determines whether to respond to the query by retrieving data from the database, or by using the equations, and when it is determined to respond using the equations, then
code that forwards the query to the equation analysis unit,
code that determines, for each of the two or more streams of data, the particular time interval the query is directed to,
code that determines, based on the particular time interval the query is directed to for each of the two or more streams of data, which equation and equation coefficients from the plurality of equation and equation coefficients fit that stream of data for that particular time interval,
code that selects, based on the particular time interval the query is directed to for each of the two or more streams of data, the equation and equation coefficients that fit that stream of data for that particular time interval, and
code that simultaneously solves the selected equations to determine a response to the query; and
wherein the codes are executed on the one or more processors of the computer implemented system.

12. The computer implemented system of claim 11, wherein the database queries are SQL queries.

13. The computer implemented system of claim 11, wherein multiple streams are modeled using multiple equations.

14. The computer implemented system of claim 13, wherein the database queries include join queries done using the simultaneous solution of multiple equations.

15. The computer implemented system of claim 11, wherein the equation is produced using an ARIMA model.

16. The computer implemented system of claim 11, wherein multiple models are used to produce multiple equations to approximate a single stream of data to select the model and the equation that produces a good fit to the stream of data.

17. The computer implemented system of claim 11, wherein coefficients for the equation are maintained.

18. The computer implemented system of claim 11, wherein the equation and coefficients for the equation are updated as more of the stream of data is received.

19. The computer implemented system of claim 11, wherein a probabilistic technique is applied towards correcting data losses and provides the response to the query with a quantified accuracy.

20. The computer implemented system of claim 11, wherein the step of selecting an equation and equation coefficients that optimally fits that sample further includes
testing a plurality of equations in parallel for said sample, and selecting the equation and equation coefficients that optimally fits said sample.

21. A non-transitory computer readable storage medium including one or more sequences of instructions, said one or more sequences of instructions when executed by one or more processors, cause the one or more processors to carry out the steps of:
receiving a plurality of streams of data, for storage in a database;
for each of the plurality of streams of data, sampling that stream of data at a plurality of time intervals to capture a plurality of samples, wherein each sample corresponds to a portion of that stream of data captured during that time interval;
providing a plurality of equations and equation coefficients stored in an equation analysis unit;
for each of the plurality of samples, approximating that sample by selecting an equation and equation coefficients that optimally fits that sample, wherein the equation and equation coefficients for each of the plurality of samples is selected from a plurality of equations and equation coefficients stored in an equation analysis unit;
storing the plurality of streams of data in the database;
storing the equations and equation coefficients approximating the plurality of samples in the equation analysis unit;
subsequently receiving, by a database query arbiter, a query for data which includes a join over two or more of the streams of data, for a particular time interval;
determining whether to respond to the query by retrieving data from the database, or by using the equations, and when it is determined to respond using the equations, then
forwarding the query to the equation analysis unit,
determining, for each of the two or more streams of data, the particular time interval the query is directed to,
determining, based on the particular time interval the query is directed to for each of the two or more streams of data, which equation and equation coefficients from the plurality of equation and equation coefficients fit that stream of data for that particular time interval,
selecting, based on the particular time interval the query is directed to for each of the two or more streams of data, the equation and equation coefficients that fit that stream of data for that particular time interval, and simultaneously solving the selected equations to determine a response to the query.

22. The non-transitory computer readable storage medium of claim 21, wherein the database query is a SQL query.

23. The non-transitory computer readable storage medium of claim 21, wherein multiple streams are modeled using multiple equations.

24. The non-transitory computer readable storage medium of claim 23, wherein the database query is a join query done using the multiple equations.

25. The non-transitory computer readable storage medium of claim 21, wherein the equation is produced using an ARIMA model.

26. The non-transitory computer readable storage medium of claim 21, wherein multiple models are used to produce multiple equations to approximate a single stream of data to select a model and equation that produces a good fit to the stream of data.

27. The non-transitory computer readable storage medium of claim 21, wherein coefficients for the equation are maintained.

28. The non-transitory computer readable storage medium of claim 21, wherein the equation and coefficients for the equation are updated as more of the stream of data is received.

29. The non-transitory computer readable storage medium of claim 21, wherein a probabilistic technique is applied towards correcting data losses and provides the response to the query with a quantified accuracy.

30. The non-transitory computer readable storage medium of claim 21, wherein the step of selecting an equation and equation coefficients that optimally fits that sample further includes
    testing a plurality of equations in parallel for said sample, and selecting the equation and equation coefficients that optimally fits said sample.

31. A method for implementing database queries for a data stream, comprising:
    receiving a stream of data, for storage in a database;
    sampling the stream of data at a plurality of time intervals to capture a plurality of samples, wherein each sample corresponds to a portion of that stream of data captured during that time interval;
    providing a plurality of equations and equation coefficients stored in an equation analysis unit;
    for each of the plurality of samples, approximating that sample by selecting an equation and equation coefficients that optimally fits that sample, wherein the equation and equation coefficients for each of the plurality of samples is selected from a plurality of equations and equation coefficients stored in the equation analysis unit;
    storing the stream of data in the database;
    storing the equations and equation coefficients approximating the plurality of samples in the equation analysis unit;
    subsequently receiving, by a database query arbiter, a query for data for a particular time interval;
    determining whether to respond to the query by retrieving data from the database, or by using the equations, and when it is determined to respond using the equations, then
        forwarding the query to the equation analysis unit,
        determining the particular time interval the query is directed to,
        determining, based on the particular time interval the query is directed to, which equation and equation coefficients from the plurality of equation and equation coefficients fit the stream of data for that particular time interval,
        selecting, based on the particular time interval the query is directed to, the equation and equation coefficients that fit the stream of data for that particular time interval, and
        using the equation and equation coefficients for that particular time interval to determine a response to the query; and
    wherein the method steps are performed by at least one processor.

32. A method for implementing database queries for a data stream, comprising:
    receiving a stream of data;
    sampling the stream of data at a plurality of time intervals to capture a plurality of samples, wherein each sample corresponds to a portion of the stream of data captured during that time interval;
    providing a plurality of equations and equation coefficients stored in an equation analysis unit;
    for each of the plurality of samples, approximating that sample by selecting an equation and equation coefficients that optimally fits that sample, wherein the equation and equation coefficients is selected from a plurality of equations and equation coefficients stored in the equation analysis unit;
    storing the equations and equation coefficients approximating the samples in the equation analysis unit;
    subsequently receiving a query for data for a particular time interval;
    responding to the query by
        forwarding the query to the equation analysis unit,
        determining the particular time interval the query is directed to,
        determining, based on the particular time interval the query is directed to, which equation and equation coefficients from the plurality of equation and equation coefficients fit the stream of data for that particular time interval,
        selecting, based on the particular time interval the query is directed to, the equation and equation coefficients that fit the stream of data for that particular time interval, and
        using the equation and equation coefficients for that particular time interval to determine a response to the query; and
    wherein the method steps are performed by at least one processor.

* * * * *

UNITED STATES PATENT AND TRADEMARK OFFICE
CERTIFICATE OF CORRECTION

| | | |
|---|---|---|
| PATENT NO. | : 8,150,861 B2 | Page 1 of 1 |
| APPLICATION NO. | : 11/231095 | |
| DATED | : April 3, 2012 | |
| INVENTOR(S) | : Sengupta | |

It is certified that error appears in the above-identified patent and that said Letters Patent is hereby corrected as shown below:

On front page, in column 2, under "Other Publications", line 3, delete "Modesl" and insert -- Models --, therefor.

In column 1, line 36, delete "steam" and insert -- stream --, therefor.

In column 1, line 55, after "stream" insert -- . --.

In column 1, line 57, delete "steam" and insert -- stream --, therefor.

In column 1, line 63, delete "put of" and insert -- put off --, therefor.

In column 2, line 6, after "maintained" insert -- . --.

In column 2, line 36, delete "steams." and insert -- streams. --, therefor.

In column 6, line 8, after "B.price" insert -- . --.

In column 7, line 22, after "values" insert -- . --.

In column 7, line 54, after "original" insert -- . --.

Signed and Sealed this
Twenty-fourth Day of July, 2012

David J. Kappos
*Director of the United States Patent and Trademark Office*